June 1, 1943.　　C. E. BENNETT ET AL　　2,320,506
METHOD OF FORMING DAMS
Original Filed March 4, 1939
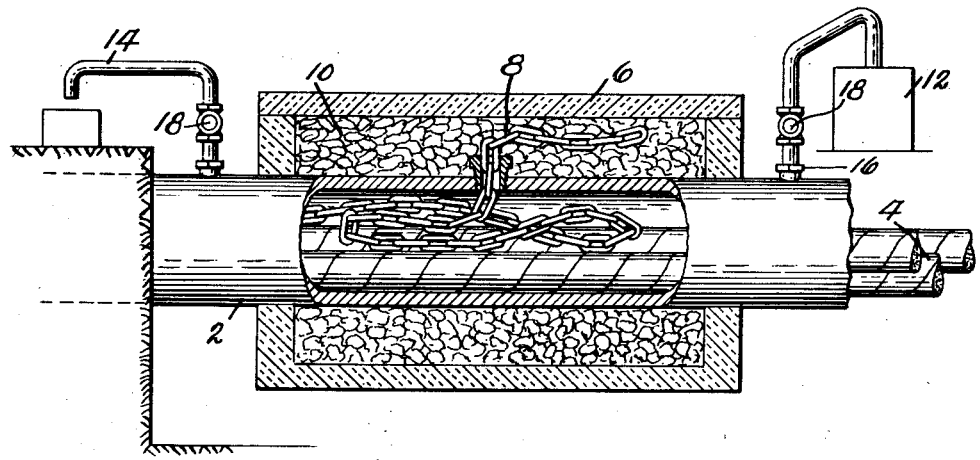
INVENTORS.
Charles E. Bennett and Fred C. Meyer
BY
Kiddie, Bethell and Montgomery.
ATTORNEYS Patented June 1, 1943

2,320,506

UNITED STATES PATENT OFFICE 2,320,506

METHOD OF FORMING DAMS

Charles E. Bennett, Ridgewood, and Fred C. Meyer, Wyckoff, N. J., assignors to The Okonite-Callender Cable Company, Incorporated, Paterson, N. J., a corporation of New Jersey Original application March 4, 1939, Serial No. 259,778. Divided and this application September 10, 1941, Serial No. 410,258

5 Claims. (Cl. 62—1)

This invention is directed to a method for forming dams in pipe lines, more specifically pipe lines containing oil or other liquid, whereby the line may be dammed or blocked at such intervals as may be desired to permit of tests being made for leaks in the pipe line between adjacent dams.

One of the advantages of our method resides in the fact that it is relatively inexpensive because no elaborate equipment is necessary and it is unnecessary to uncover long lengths of the line being examined.

Broadly speaking, our invention comprehends freezing of the liquid in the pipe line at predetermined intervals in the line so that the line can be tested intermediate these blocks or dams.

More specifically, the present invention is directed to a process in which a thermal conductor is introduced into the pipe line at the site of the desired dam; a refrigerant is then packed about the pipe line at the point of introduction of the thermal conductor, a portion of the thermal conductor contacting the refrigerant. A very heavy compound is then introduced into the line and frozen in situ. The thermal conductor, we find, effects a considerable saving in the time required for the freezing operation.

The dams or blocks are formed at intervals along the line, as above noted, where a leak is suspected, and after the line has been blocked it is an easy matter to test for leaks between the blocks and make the necessary repairs.

In the accompanying drawing we have shown an embodiment of our invention somewhat diagrammatically.

Referring to the drawing in detail: 2 designates a pipe line which it is understood is buried in the ground. This line may be of any length and the dams are formed at any desired intervals and at any desired location in the line depending upon the site of the leak which it is desired to locate. The line contains oil or other liquid and in the embodiment of the invention, as illustrated, the pipe line 2 contains insulated electric conductors 4, in which event the line is filled with insulating oil.

If a leak develops in the line 2 it becomes necessary, of course, to make a survey of the line to determine about where the leak is located. In this connection it is customary to examine the ground for oil pools, loss of vegetation, etc. Having decided upon the approximate location of the leak the pipe line is excavated for a few feet at each side of the point where it is thought the leak is located.

A casing such as shown at 6 is then built around the pipe line at the excavated areas. These casings are heat insulated. Before each casing is placed in position a metal thermal conductor such as a copper chain, designated 8, is placed in the pipe line and partially fills the line at that area. The outer end of this chain extends out of the line into the casing itself. The casing is then filled with a refrigerant such as ice and salt, for example, or with a mixture of gasoline and $CO_2$ ice. We find a satisfactory procedure is to fill or partially fill the casing with gasoline and then add $CO_2$ ice. The refrigerant is designated 10. In this way we are able to control the temperature of the refrigerant of the casing 6 from room temperature down to around $-70°$ C.

The equipment is then allowed to stand for a short time, say for an hour, thoroughly to chill the liquid in the line at the casings. It is important at this stage that the liquid be chilled uniformly throughout the area to be blocked and that chilling be effected slowly because of the fact that quick freezing tends to build up an insulating ring or annulus of ice about the center of the area to be blocked.

We next introduce a compound into the pipe line having a pour point higher than that of the liquid in the line. This compound, which is pre-chilled, is introduced at as low a temperature as possible by a pressure gun shown diagrammatically at 12. This gun may be similar to the grease guns employed for chassis lubrication and be capable of developing pressures of as high as 10,000 pounds, or even higher, per square inch. The pipe line is preferably provided with vent pipes 14. The gun may be attached at 16 and valves 18 may be provided in the charging and vent lines.

The introduction of the compound from 12 is preferably done in two stages. In other words, part of the compound is introduced, then the equipment allowed to stand for a short time and thereafter the remainder of the compound introduced.

When the mass at the areas to be blocked or dammed is frozen solid then, of course, tests for leaks can be made between the dams or blocks. We have obtained good results where an 8⅝ inch O. D. pipe line containing three single conductor cables has been filled with 720 second viscosity oil (Saybolt Universal at 100° F.) with a pour point of $-20°$ F. and a compound such as a mixture of this same oil with rosin to raise its pour point to a temperature of around 60° F. More specifically, before introducing the compound the pipe line 2 was cooled for an hour, then some compound introduced and freezing continued for four more hours, after which more compound was introduced and freezing continued for several hours more until the mass of liquid material surrounded by the casing 6 was frozen solid. About 10 gallons of compound were employed and about 12 hours required to effect a complete seal. By cooling or chilling the pipe line for some time before introducing the compound the liquid in the pipe line at the area surrounded by the casing is thickened so as to prevent dispersion of the compound in this liquid except at the site at which the dam or block is to be formed.

The compound may be removed after completion of the operation by slight heating to drive off the compound through the vent pipe 14 simply by closing the valve 18 in the line from the pressure supply and opening the valve 18 in the vent line 14.

It is to be understood, of course, that there is considerable flexibility in our method so far as selection of compound is concerned. The compound above referred to is mentioned merely by way of example.

We have found that the process is speeded up considerably if a thermal conductor such as the chain 8 is employed as compared with the time required where no thermal conductor is employed. We find that by employing the thermal conductor, such as the chain 8, we eliminate the tendency of the liquid in the line to freeze adjacent the pipe thereby to act as an insulator and prevent freezing of the liquid nearer the center of the pipe line. By reason of this fact we find that it is practicable to omit the initial chilling of the line or at least appreciably to shorten the chilling stage. We find, also, that by employing the thermal conductor such as the chain 8 the time that each batch of compound is allowed to stand before the introduction of the next batch is considerably reduced.

It will be understood, of course, that thermal conductors other than the chain 8 may be employed. For example, we may employ a flexible stranded conductor, woven wire, or other flexible metallic thermal conductor.

It is to be understood that changes may be made in the process described without departing from the spirit and scope of this invention.

This application is a division of our copending application Serial No. 259,778, filed March 4, 1939, which has become Patent No. 2,257,727.

What we claim is:

1. The process of forming a dam in a liquid-containing metal pipe line, which process comprises introducing a thermal conductor into the pipe line at a predetermined site, packing a refrigerant about the pipe line at said site, a portion of the said thermal conductor extending out of the line into contact with the refrigerant, allowing the equipment to stand until the liquid at the said site has been chilled uniformly throughout without building up an annulus of ice about the center of said site, introducing a batch of compound into the chilled liquid, said compound being of such a nature as to be retained in the chilled liquid, allowing the equipment to stand until the added compound is thoroughly chilled, adding another batch of the compound and allowing the equipment to stand until the second batch of compound is thoroughly chilled, and repeating this cycle until the mass of liquid and added compound at the desired site of the dam has been frozen solid.

2. The process of forming a dam in a pipe line containing a liquid, which process comprises introducing a thermal conductor into the pipe line at a predetermined site, packing a refrigerant about the pipe line at said site, a portion of said thermal conductor contacting said refrigerant, and introducing a compound into the pipe line at said site, the compound having a pour point higher than that of the liquid, and effecting freezing of the mixture of liquid and compound in situ.

3. The process of forming a dam in a liquid-containing pipe line, which process comprises introducing a thermal conductor into the pipe line at a predetermined site, packing a refrigerant about the pipe line at said site, a portion of the thermal conductor contacting the refrigerant, introducing a compound into the pipe line having a pour point which is not lower than the liquid in the pipe line, and then effecting freezing of the mixture of liquid and compound in situ.

4. The process of forming a dam in a liquid-containing pipe line, which process comprises introducing a metal thermal conductor into the pipe line at a predetermined site, packing a refrigerant about the pipe line at said site, with a portion of the said thermal conductor contacting the refrigerant, introducing a compound into the pipe line at said site, this compound having a pour point higher than that of the liquid, and effecting freezing of the mixture of liquid and compound in situ.

5. The process of forming a dam in a liquid-containing pipe line, which process comprises introducing a flexible metal thermal conductor into the pipe line at a predetermined site, packing a refrigerant about the pipe line at said site, with a portion of the said thermal conductor contacting the refrigerant, introducing a compound into the pipe line at said site, this compound having a pour point higher than that of the liquid, and effecting freezing of the mixture of liquid and compound in situ.

CHARLES E. BENNETT.
FRED C. MEYER.